United States Patent [19]

Scarberry et al.

[11] 4,353,498
[45] Oct. 12, 1982

[54] MULTIPLE PLY COEXTRUSION

[75] Inventors: Walter P. Scarberry, St. Charles; Charles K. Vollman, Elgin, both of Ill.

[73] Assignee: Health-Ex Corporation, Chicago, Ill.

[21] Appl. No.: 222,749

[22] Filed: Jan. 5, 1981

[51] Int. Cl.³ .............. B29F 3/00; B65D 65/28; B65D 27/10
[52] U.S. Cl. .................. 229/69; 156/244.25; 206/604; 264/171; 428/136; 428/43
[58] Field of Search .......... 428/43, 136; 206/604; 264/171; 156/244.25

[56] References Cited

U.S. PATENT DOCUMENTS

| | | | |
|---|---|---|---|
| 3,186,628 | 6/1965 | Rohde | 206/620 |
| 3,368,740 | 2/1968 | Rohde | 206/634 X |
| 3,369,267 | 2/1968 | Friedland et al. | 206/216 X |
| 3,533,550 | 10/1970 | Benzon-Petersen | 428/461 X |
| 3,535,409 | 10/1970 | Rohde | 425/317 X |
| 3,640,381 | 2/1972 | Kanada et al. | 229/55 X |
| 3,790,744 | 2/1974 | Bowen | 156/268 X |
| 3,909,582 | 9/1975 | Bowen | 206/498 X |
| 3,939,972 | 2/1976 | Mayworm | 206/219 |

Primary Examiner—Henry F. Epstein
Attorney, Agent, or Firm—Lockwood, Dewey, Alex & Cummings

[57] ABSTRACT

A coextruded film having an integral tear path is provided such that the tear path has a thickness that is smaller than the overall thickness of the coextruded film, said product being formed by a method and on an apparatus that introduces an elongated void in at least one of the extrudates before being combined with other extrudates into the coextruded film, said elongated void accounting for the reduced thickness of the tear path.

27 Claims, 17 Drawing Figures

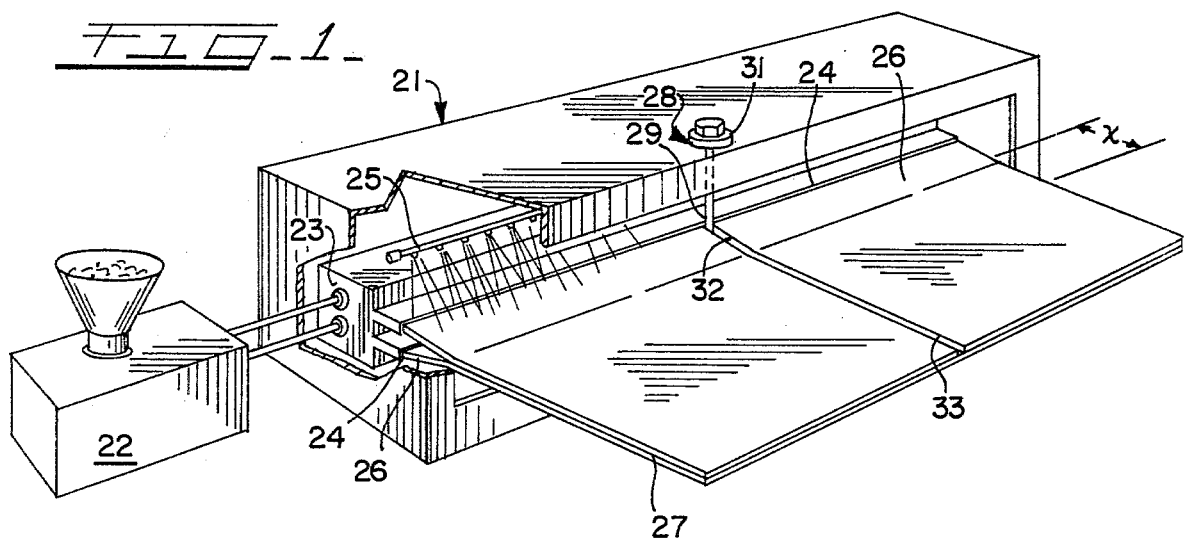
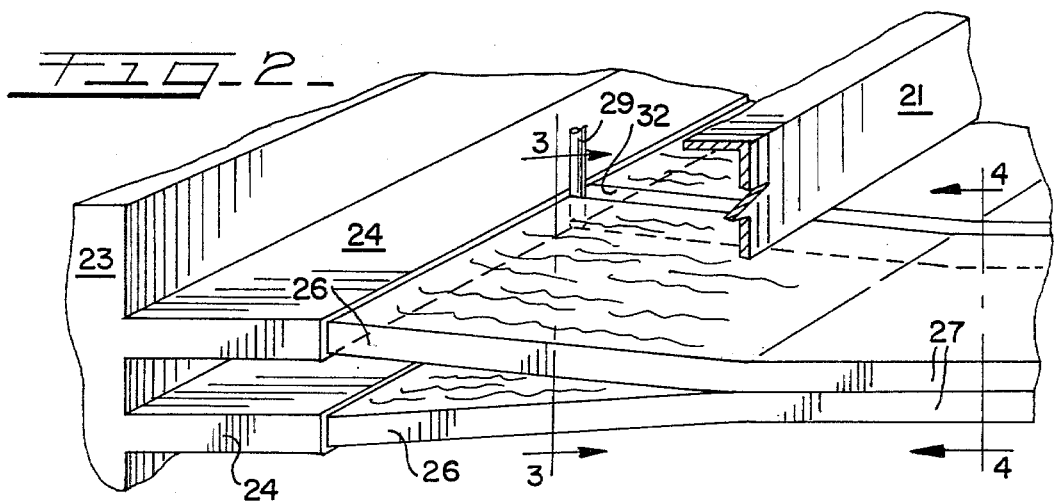
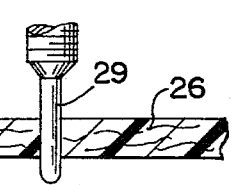
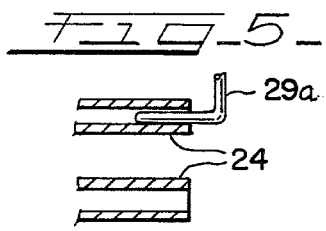
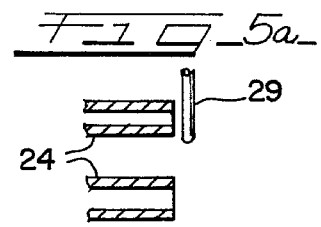
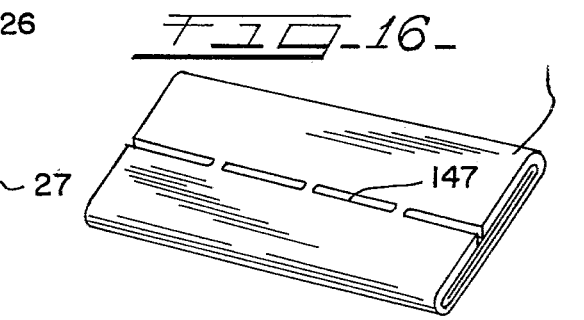

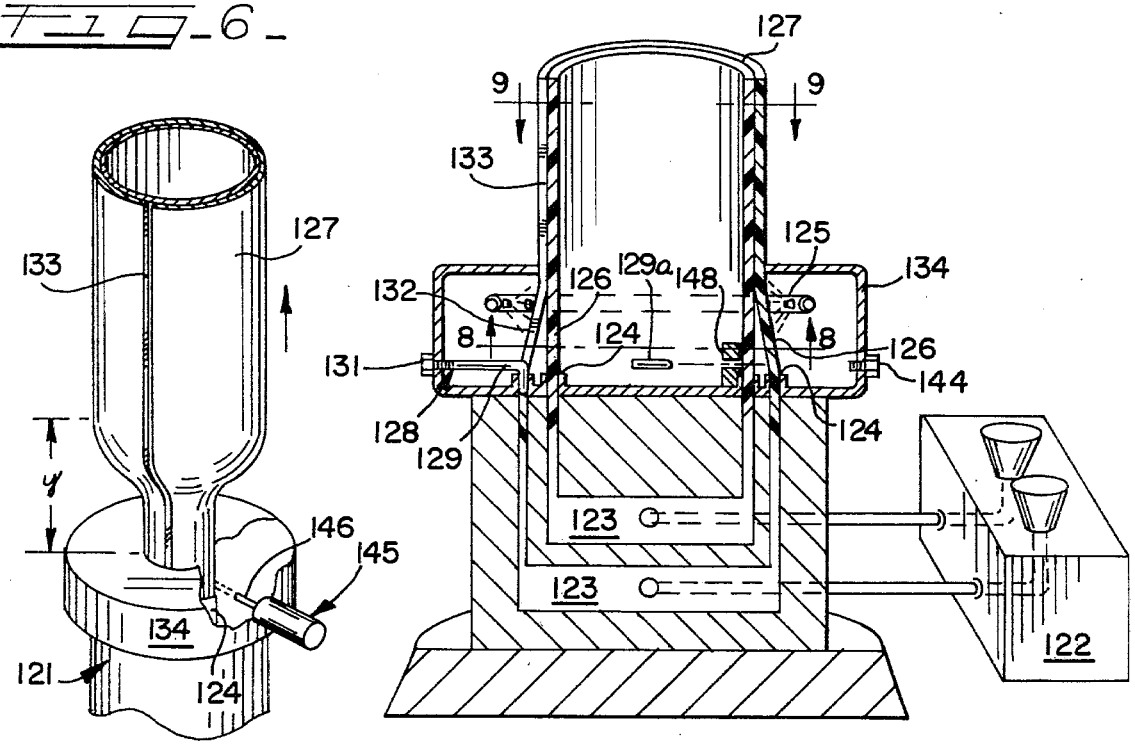
FIG.-6-
FIG.-7-
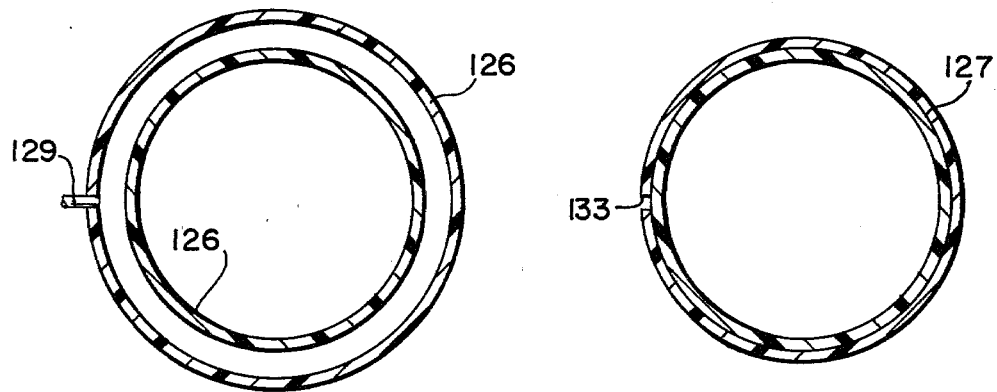
FIG.-8-
FIG.-9-
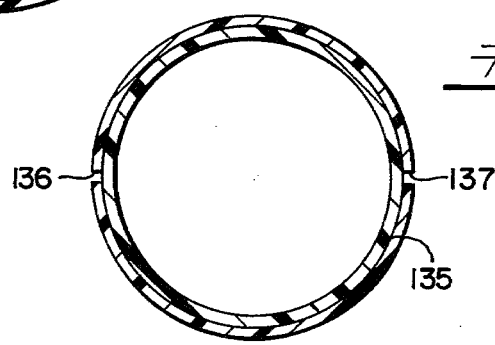
FIG.-10-

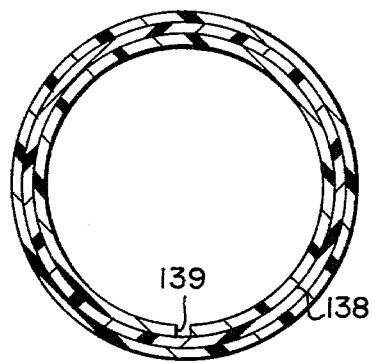
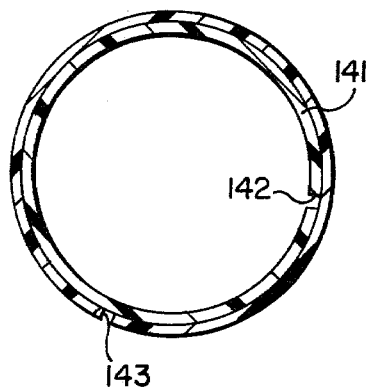
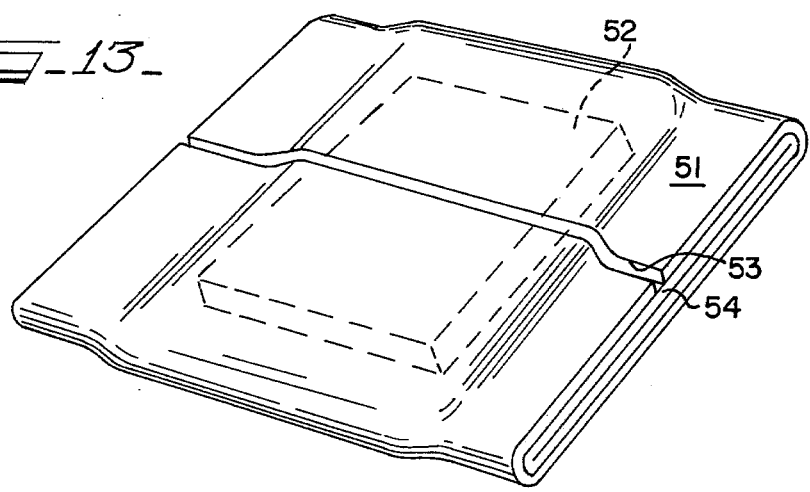
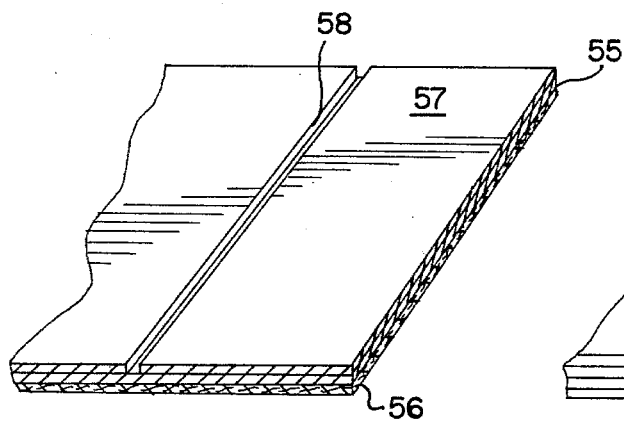
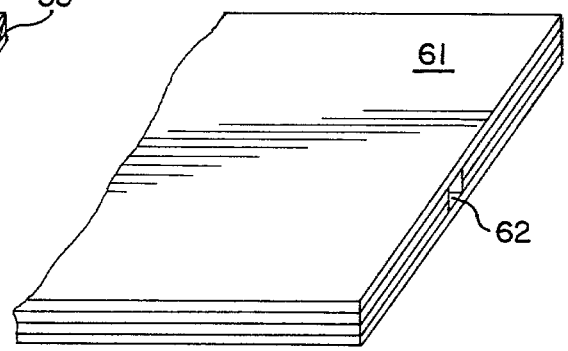

MULTIPLE PLY COEXTRUSION

BACKGROUND AND DESCRIPTION OF THE INVENTION

This invention generally relates to the coextrusion of films, and more particularly to a method, product and apparatus in which a tear path is formed during the coextrusion of a plurality of extrudates that make up the coextruded film, said tear path formation being accomplished by interrupting the extrusion of at least one of the plurality of extrudates before same is combined with the other extrudates into the coextruded film.

It is well known to modify thermoplastic films in a variety of manners so as to provide a means for opening packages made therewith without having to use a tool to sever the package, such typically being lines of severance taking the form of perforations, strips of one type of material molded into a bag of a different material, and score groove lines such as those described in U.S. Pat. No. 3,186,628. Some such structures are not suitable for forming impermeable packages in that they eliminate the integrity of the film by forming perforations therethrough or they can risk loss of such integrity by introducing scored lines having a depth that is not always uniformly controlled to the extent that the thickness of the film at some locations along the scored tear path can be excessively reduced, resulting in film breakthrough thereat during normal handling. Permeability, whether it be intentional as is the case for perforations through the film, or unintentional, such as that sometimes brought about by an excessively deep location along a scored line, are not suitable for applications where it is critical to maintain the integrity and/or impermeability of the film. This is especially important for applications where the film is to be used in preparing gas-impermeable enclosures or containers demanding relatively large lateral strength values. The difficulty in controlling the depth of score groove lines also causes grooving to a depth less than that intended for a particular end use, leading to unsatisfactory products or to scrapping by the manufacturer.

There is accordingly a need for films and enclosures having a tear path that is imperforate and that has a uniformity of depth and width that provides packaging materials and products having a tear path depth, configuration and tear resistance or strength that can be varied as desired in a reliable and exceptionally uniform manner. It would also be produced on equipment and by a method that does not require the expenditure of substantial capital over that readily available to a manufacturer of coextruded film products.

Such desirable attributes and properties are achieved in accordance with the present invention by providing films that are coextruded from at least two extrudates, at least one of which has its extrusion flow interrupted at one or more narrow locations so as to form an elongated void within the extrudate, such elongated void, which is introduced before the extrudates are laminated or combined into a coextrudate, forming a uniform tear path in the solidified coextrudate having a depth, width and length as desired for the particular intended end use. Each desired extrudate flow interruption is typically provided by a tine interposed within the path of molten extrudate in close proximity with, directly adjacent to and/or inside of the extrusion orifice through which the extrudate flows.

It is accordingly a general object of this invention to provide a film having a tear path therewithin.

Another object of this invention is to provide an improved film, packaging material, and enclosure product that is coextruded with a tear path of uniform depth.

Another object of the present invention is an improved apparatus and method incorporating a closely controlled manner of tear path formation.

Another object of the present invention is an improved apparatus, method and product incorporating coextrusion techniques that are modified so as to provide a tear path within the solidified coextrudate.

Another object of this invention is an improved apparatus, method and product incorporating a tear path that is variable as desired to provide a preselected, substantially uniform and reproducible tear path strength.

These and other objects of the invention will become apparent from the following detailed description and drawings, wherein:

FIG. 1 is a perspective view, partially cut away, of an apparatus, modified in accordance with this invention, for coextruding a film in sheet form;

FIG. 2 is an enlarged detail view of the coextrusion structure illustrated in FIG. 1;

FIG. 3 is a sectional view along the line 3—3 of FIG. 2, illustrating the extrudates in their molten state;

FIG. 4 is a sectional view along the line 4—4 of FIG. 2 illustrating the extrudates after being combined into a multiple ply coextrudate;

FIG. 5 is a sectional view of a coextrusion die, showing the preferred tine location in the apparatus;

FIG. 5a is a sectional view of a coextrusion die, showing an alternative tine location in the apparatus;

FIG. 6 is a perspective view, partially cut away, of a blown film forming apparatus modified according to the present invention;

FIG. 7 is a cut-away enlarged detail view of the type of device generally illustrated in FIG. 6;

FIG. 8 is a sectional view along the line 8—8 of FIG. 7, illustrating the individual extrudates in their molten states;

FIG. 9 is a sectional view along the line 9—9 of FIG. 7, illustrating the blown film after the extrudates have been combined into the coextruded multiple ply blown film;

FIG. 10 is a view similar to FIG. 9, illustrating a coextrudate having two tear paths formed within the outer extrudate;

FIG. 11 is a view similar to FIG. 9, depicting an alternative embodiment having a tear path in the internal extrudate;

FIG. 12 is a view similar to FIG. 9, showing an alternative embodiment having a tear path in the inner extrudate and another tear path in the outer extrudate;

FIG. 13 is an illustration, in perspective, of a hermetically sealed product according to this invention, shown with an item sealed therewithin;

FIG. 14 is an illustration, in broken-away perspective, of a product according to this invention including a film according to this invention sealed to a dissimilar film or sheet;

FIG. 15 is an illustration, in broken-away perspective, of an alternative embodiment having an internal tear path; and FIG. 16 is an illustration, in broken-away perspective, of an alternate embodiment having a tear path of non-uniform depth throughout its length.

Illustrated in FIG. 1 is a coextrusion means, generally designated as 21, having an extruder 22 and a coextrusion die 23 with coextrusion channels or orifices 24. Coextrusion means 21 typically includes cooling means 25 for reducing the temperature of the extrudates 26 after they leave the coextrusion channels or orifices 24, including while they are joined into a coextrudate and thereafter until the plurality of molten extrudates 26 form a solidified coextrudate 27.

The apparatus in accordance with this invention incorporates interrupting means 28 which blocks the flow of molten polymer at a relatively narrow location in the flow path of at least one of the molten extrudates 26. The preferred interrupting means 28 takes the form of a stationary tine 29 which is rigidly mounted to the coextrusion means 21 by any suitable mounting means 31. Tine 29, which is shown in FIGS. 1 and 2 butting against the outer lip of one of the extrusion orifices 24, interrupts the flow of extrudate 26 at that particular location whereby an elongated void 32 is formed within the extrudate 26 while it is still in its molten stage and before the extrudate 26 enters the so-called frost portion having a length generally illustrated at "x" in FIG. 1. Such elongated void 32, after the coextrudate 27 has been formed and has passed through the frost portion "x", solidifies into a tear path 33 in accordance with this invention.

In order to most easily prepare a tear path 33 of exceptional uniformity, the tine 29 is stationary and is located such that it blocks the entire height of at least one of the extrusion orifices 24, in order to form an elongated void 32 that runs the entire height of the extrudate 26 subsequently forming a ply of the coextrudate 27. In the preferred embodiment, the tine is a tine 29a that is generally parallel to the extrudate flow and located within extrusion orifice 24, as illustrated in FIG. 5. The tine 29 can be butting up against the orifice 24 as shown in FIG. 2 and positioned at any angle relative to the extrudate flow, or tine 29 can be spaced a very short distance from the orifice 24 as shown in FIG. 5a.

Another embodiment of the apparatus in accordance with this invention is illustrated in FIGS. 6 and 7 wherein the coextrusion means 121 is of the so-called blown film type that forms a cylindrical coextrudate 127 which, after cooling is collapsed by conventional means (not shown) into a continuous, relatively flat tube that may be cut into sections and sealed at the cutting lines to form a fully enclosed package of the type shown in FIG. 13. Coextrusion means 121 may extrude the film upwardly as illustrated, horizontally, or in any other acceptable orientation.

As can be seen from FIG. 7, the coextrusion means 121 includes an extruder 122, extrusion dies 123, extrusion channels or cylindrical orifices 124, cooling means 125, and interrupting means, generally designated at 128. Extrudates 126 emanate from the coextrusion orifices 124 to form the coextrudate 127 as the extrudates 126 cool and solidify. Means 121 also includes a cooling ring 134 of conventional structure to assist in lowering the temperature of the extrudates 126 and form an annular frost band, generally designated as "y", wherein the polymer being extruded is transformed from its molten state to its solid state. The film may be literally blown up, that is increased in diameter as illustrated in FIG. 6, or it may remain of generally constant diameter as illustrated in FIG. 7, depending upon the width desired for the packaging film being produced.

With more particular reference to the interrupting means 128, such may be of any suitable structure, one of which includes a tine 129 secured to the coextrusion means 121 by any suitable mounting means 131 such as the threaded "hex" nut illustrated. Means 128 can be positioned at various other locations and mounted in any other manner, so long as they are in close proximity with, contacting, or directly inside of the coextrusion orifice 124. For example, a plug 144 can be removed from the apparatus shown in FIG. 7, and another interrupting means inserted through the location from which the plug was removed. Other ways of mounting the interrupting means 128 include the incorporation of a frame 148 overlying the coextrusion orifice 124, which frame serves as a mounting means for tines 129a at substantially any location along such coextrusion orifice 124.

FIG. 8 illustrates the molten extrudates 126 at a location directly above the tine 129, which forms an elongated void 132 (FIG. 7), while FIG. 9 illustrates the solidified, multiple ply coextrudate 127 having a tear path 133 formed therein at the location of the elongated void 132 in the molten extrudate 126.

A further alternative embodiment of the apparatus according to this invention is illustrated generally in FIG. 6, which embodiment includes a reciprocating type of interrupting means 145 having a tine 146 that reciprocates between an extended interrupting position (shown in phantom lines in FIG. 6) and a retracted position (shown in solid lines in FIG. 6) as the molten extrudates 126 flow out of the orifices 124. Such a reciprocating interrupting means 145 produces a coextruded film of the type illustrated in FIG. 16 having a discontinuous tear path 147 which is especially advantageous for preparing tear paths of exceptionally high strength.

Products in accordance with this invention include coextruded films having tear paths such as those illustrated in FIGS. 4 and 9 through 16, as well as any other multiple-ply coextrudates formed from a plurality of molten extrudates, at least one of which has one or more longated voids.

FIG. 10 shows a product embodiment wherein one of the extrudates 126 was interrupted at two different locations in order to form a coextrudate 135 having two tear paths 136 and 137, it being understood that further embodiments include multiple ply coextrudates, such as three-ply and four-ply films made from three and four molten extrudates, respectively, any one or more of which may have one or more tear paths therewithin. FIG. 11, for example, illustrates a three-ply coextrudate 138 made from three separate molten extrudates, in which the innermost ply has a tear path 139, with FIG. 12 illustrating a two-ply film 141 having an inner tear path 142 and an outer tear path 143. These structures are formed by appropriate coextrusion means having two, three, four or so forth coextrusion dies and by placing tines at appropriate locations in, at or near the outlets thereof.

Other products include sealed enclosures such as bag 51 illustrated in FIG. 13 within which is hermetically sealed an item 52 than can be readily removed from the bag 51 when desired by grasping the bag on opposite sides of the longitudinal tear strip 53 and applying pressure in opposite directions so as to tear through at least ply 54 located directly under the tear path 53. FIG. 14 illustrates a two ply coextrusion sheet 55 bonded to a sheet 56 of dissimilar material which can be, for example, a layer of gas permeable material such as paper of other cellulosic stock in order to form a gas permeable bag 57 having a transverse tear path 58, the two-ply coextrusion sheet 55 being bonded to the sheet 56 by any suitable means. FIG. 15 illustrates a container 61 having an internal tear strip 62, while the container illustrated in FIG. 16 includes a discontinuous tear path 47 having a depth that is intentionally varied along the length thereof.

The tear path in any of the products according to this invention is self-revealing due to the fact that the extrusion interruption that is characteristic of the invention creates a slight film depth build up immediately adjacent to the tear path, which built-up depth refracts light to an extent different from either the tear path or the rest of the film. While these tear paths are inherently visible or self revealing, they can be made more readily visible by utilizing extrudates of a different visible appearance, such as color or extent of transparency, whereby the tear path will be easily identified as a line having a color or shading different from the color or shading of the remainder of the product.

Each of the tear paths of these various product embodiments is an extrusion interrupted elongated void within a molten extrudate which formed one of the multiple plys of the film. Such extrusion interrupted elongated void is one formed by interrupting or blocking off the extrusion flow at the earliest stage of extrudate formation and at a preselected location or locations, each such location being of a width adequate to produce a tear path of a desired width, typically a very narrow width. The interrupting is accomplished by interposing a narrow, elongated tine at any angle with respect to the extrusion flow, preferably parallel thereto, such tine being closely spaced from or adjacent to the lip of the extruder or projecting into the orifice of the extrusion die.

By the method in accordance with this invention, there is produced a coextruded film having a tear path of a thickness less than the coextruded film thickness, such method including interrupting, at a preselected narrow location or locations, at least one of a plurality of molten extrudates to form one or more elongated voids through such one or more molten extrudates corresponding to the narrow areas of interruption, which elongated voids establish a tear path in a coextruded film incorporating such extrudates. p More particularly, the method includes supplying one or more extrudable materials which are typically polymers in powdered, granulated or solid form at room temperature. When it is desired to produce a multiple ply product of identical materials, only one type of polymer raw material will be utilized, while multiple ply coextruded films having plys of different character, such as density, coloration, extent of transparency, and/or polymer materials, are produced by selecting appropriate differing polymer compositions as the extrudates. Generally, any such material will be a polymer having thermoplastic properties that provides a film of the type desired for the particular end use intended, such polymers falling within the general categories of polyolefins, vinyl polymers, polyesters, and elastomeric polymers, copolymers or polymeric blends that exhibit adequate extrudability. Particular polymers include polyvinyl chloride, polyvinyl acetate, low, medium and high density polyethylene, polypropylene and polystyrene, nylon, blends of polyethylene and a conjugated diene, and the like.

Next, the thus selected polymer or polymers are extruded in a conventional manner and then passed through extrusion orifices or a coextrusion die in order to form at least two molten extrudates. At least one of said plurality of molten extrudates is interrupted at one or more narrow locations prior to lamination of the extrudates into a coextrudate, thereby preventing extrudate flow thereat in order to form an elongated void in the particular extrudate.

The plurality of extrudates, including each extrudate in which an elongated void is being formed therewithin, pass into a cooling zone while they are combined into a coextrudate of the desired number of plys, the cooling zone being followed by and typically overlapping with a frost zone wherein the extrudates and the coextrudate are gradually changing from their molten state to their solidified multiple ply coextruded state so as to form a product having a tear path corresponding to the location of each elongated void in the extrudate.

Preferably, the interrupting step interrupts the flow of the extrudate throughout its thickness and length, thereby enhancing the uniformity of the eventually formed tear path and providing a product having superior quality control characteristics while substantially eliminating product scrapping caused by attempting to score or groove a tear line partially through the type of thin sheets produced according to this invention. In an alternative embodiment, the interrupting step can be carried out on an intermittent basis by varying the depth of penetration through the thickness of the extrudate, such depth of penetration varying between no penetration of the molten extrudate and penetration completely through the molten extrudate depth of thickness in order to form a discontinuous tear path that begins and ends at various locations along the length of the coextruded film. More particularly, this embodiment of the invention will alternate penetration between two positions, one being brought about by complete interruption of the extrudate flow and the other by no interruption at all, so as to form an extrudate having a perforated appearance in which the elongated void alternates between total penetration and no penetration.

Inasmuch as this invention can be embodied in various forms, it is to be construed and limited only by the scope of the appended claims.

We claim:

1. A multiple ply coextrusion film having a tear path, comprising:
   coextruded multiple plys, at least one of said plys having a tear path therein;
   said tear path being an extrusion interrupted elongated void within at least one of a plurality of molten extrudates, each said molten extrudate corresponding to one of said multiple plys of the film, said extrusion interrupted elongated void having been formed while the extrudate was in a molten state and prior to combining same into a mulitple ply coextruded film;
   said tear path having an overall thickness that is less than the total thickness of the multiple ply coextruded film; and
   said extrusion interrupted elongated void is completely through the extrudate.

2. The coextruded film of claim 1, wherein said extrusion interrupted elongated void is a discontinuous void alternating between an extrudate depth of zero and an extrudate depth equal to the extrudate thickness.

3. The coextruded film of claim 1, wherein said extrusion interrupted elongated void is formed by blocking a narrow width of the molten extrudate.

4. The coextruded film of claim 1, wherein one of said extrudates has a visible appearance different from another of said extrudates.

5. The coextruded film of claim 1, wherein said extrudates are polymer materials, one of said extrudates being of a polymer material different from that of another of said extrudates.

6. The coextruded film of claim 1, wherein said multiple ply coextruded film is a coextruded sheet.

7. The coextruded film of claim 1, wherein said multiple ply coextruded film is a blown film coextrusion.

8. A multiple ply coextruded film enclosure having a tear path, comprising:
   at least two walls of coextruded multiple ply film, at least one of said plys having a tear path therein;
   said tear path being an extrusion interrupted elongated void within at least one of a plurality of molten extrudates, each said molten extrudate corresponding to one of said multiple plys of the film, said extrusion interrupted elongated void having been formed while the extrudate was in a molten state and prior to combining same into a multiple ply coextruded film;
   said tear path having an overall thickness that is less than the total thickness of the multiple ply coextruded film; and
   said extrusion interrupted elongated void is completely through the extrudate.

9. The enclosure of claim 8, wherein said walls of coextruded multiple ply film are sealed to each other to form an envelope.

10. The enclosure of claim 8, wherein said extrusion interrupted elongated void is a discontinuous void alternating between an extrudate depth of zero and an extrudate depth equal to the extrudate thickness.

11. The enclosure of claim 8, wherein said extrusion interrupted elongated void is formed by blocking a narrow width of the molten extrudate.

12. The enclosure of claim 8, wherein one of said extrudates has a visible appearance different from another of said extrudates.

13. The enclosure of claim 8, wherein said extrudates are polymer materials, one of said extrudates being of a polymer material different from that of another of said extrudates.

14. The enclosure of claim 8, wherein at least one of said walls is a multiple ply coextruded sheet.

15. The enclosure of claim 8, wherein at least one of said walls is a multiple ply blown film coextrusion.

16. A coextruded film produced by a process comprising:
   extruding a plurality of molten extrudates into a zone wherein the multiple extrudates are combined into a multiple ply coextrusion;
   interrupting the extrusion path of at least one of the molten extrudates, said interrupting step preventing extrudate flow at a narrow location in order to form an elongated void in said at least one molten extrudate, said interrupting being carried out before the multiple extrudates are combined into the multiple ply coextrusion; and
   combining said plurality of molten extrudates into a multiple ply coextruded film having at least one tear path at the location of each elongated void, said tear path having an overall thickness less than the thickness of the coextruded film.

17. A coextruded film produced by a process including extruding a plurality of molten extrudates into a zone wherein the multiple extrudates are combined into a multiple ply coextrusion, and combining said plurality of molten extrudates into a multiple ply coextruded film, said multiple ply coextruded film having at least one tear path that has an overall thickness less than the thickness of the coextruded film, the process including an improvement comprising:
   interrupting the extrusion path of at least one of the molten extrudates before the multiple extrudates are combined into the multiple ply coextrusion, said interrupting step preventing extrudate flow at a preselected location in order to form an elongated void in said molten extrudate, which elongated void forms said tear path in the coextruded multiple ply film.

18. The film of claim 16 or 17, wherein said interrupting step takes place prior to cooling said molten extrudates into said coextruded film.

19. The film of claim 16 or 17, wherein said interrupting step is carried out shortly after completion of said extruding step.

20. The film of claim 16 or 17, wherein said interrupting step is carried out generally simultaneously with said extruding step.

21. The film of claim 16 or 17, wherein said interrupting step forms an elongated void completely through the molten extrudate by interposing a stationary tine in said extrusion path.

22. The film of claim 16 or 17, wherein said interrupting step forms an elongated void completely through the molten extrudate by interposing a tine generally parallel to said extrusion path.

23. The film of claim 16 or 17, wherein said interrupting step interposes a reciprocating member in said extrusion path to form a discontinuous elongated void.

24. The film of claim 16 or 17, wherein said extruding step forms extrudates of differing visible appearance.

25. The film of claim 16 or 17, wherein said extruding step forms extrudates of differing polymer materials.

26. The film of claim 16 or 17, wherein said extruding step is a sheet extrusion.

27. The film of claim 16 or 17, wherein said extruding step is a blown extrusion.

* * * * *

UNITED STATES PATENT AND TRADEMARK OFFICE
CERTIFICATE OF CORRECTION

PATENT NO. : 4,353,498
DATED : October 12, 1982
INVENTOR(S) : Scarberry, Walter P. and Vollman, Charles K.

It is certified that error appears in the above-identified patent and that said Letters Patent are hereby corrected as shown below:

Column 2, line 67, "alternate" should read --alternative--.

Column 3, line 50, "extrudate" should read --extrude--.

Column 4, line 41, "longated" should read --elongated--.

Column 5, line 46, after "extrudates." and before "More", should begin a new paragraph.

Signed and Sealed this

Twenty-second Day of February 1983

[SEAL]

Attest:

GERALD J. MOSSINGHOFF

Attesting Officer     Commissioner of Patents and Trademarks